(12) United States Patent
Lehtiniemi et al.

(10) Patent No.: US 10,972,800 B2
(45) Date of Patent: Apr. 6, 2021

(54) APPARATUS AND ASSOCIATED METHODS

(71) Applicant: Nokia Technologies Oy, Espoo (FI)

(72) Inventors: Arto Lehtiniemi, Lempäälä (FI); Antti Eronen, Tampere (FI); Jussi Leppänen, Tampere (FI); Juha Arrasvuori, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 220 days.

(21) Appl. No.: 16/304,811

(22) PCT Filed: May 24, 2017

(86) PCT No.: PCT/FI2017/050393
§ 371 (c)(1),
(2) Date: Nov. 27, 2018

(87) PCT Pub. No.: WO2017/207868
PCT Pub. Date: Dec. 7, 2017

(65) Prior Publication Data
US 2020/0322688 A1      Oct. 8, 2020

(30) Foreign Application Priority Data
Jun. 2, 2016 (EP) .................................. 16172627

(51) Int. Cl.
*H04N 21/4788* (2011.01)
*G06F 16/954* (2019.01)
(Continued)

(52) U.S. Cl.
CPC ....... *H04N 21/4788* (2013.01); *G06F 16/954* (2019.01); *G06Q 50/01* (2013.01); *H04N 21/4312* (2013.01); *H04N 21/8133* (2013.01)

(58) Field of Classification Search
CPC ............. H04N 21/4788; H04N 21/435; H04N 21/8547; H04N 21/4722; H04N 21/4316;
(Continued)

(56) References Cited

U.S. PATENT DOCUMENTS

2012/0150698 A1   6/2012 McClements, IV
2012/0299962 A1   11/2012 White et al.
(Continued)

OTHER PUBLICATIONS

Shah et al., "Metrics for Measuring Ideation Effectiveness", Design Studies, vol. 24, No. 2., Mar. 2003, pp. 111-134.
(Continued)

*Primary Examiner* — Samira Monshi
(74) *Attorney, Agent, or Firm* — Alston & Bird LLP (57) ABSTRACT

An apparatus caused to: in respect of video imagery of an event at which one or more commenting users are present and have submitted comments, a location of the or each of the one or more commenting users visible in the video imagery; based on a current view of the video imagery provided for display to a user and at least one comment having location information associated therewith indicative of one or more of (i) the location, at the time of making the comment, of the commenting user who submitted the comment at the event, (ii) a location, at the event, specified by the commenting user who submitted the comment at the
(Continued)

event; provide for display of the comment overlaid over the current view of the video imagery, the comment displayed in the current view of the video imagery at a position that corresponds to the location information.

20 Claims, 3 Drawing Sheets

(51) Int. Cl.
    *G06Q 50/00*     (2012.01)
    *H04N 21/431*     (2011.01)
    *H04N 21/81*     (2011.01)

(58) Field of Classification Search
CPC .......... H04N 21/812; H04N 21/64322; H04N 21/8133; H04N 7/17318; H04N 21/4882; H04N 21/84; H04N 21/8456; H04N 21/2668; H04N 21/4312; H04N 21/47202; H04N 21/2743; H04N 21/44012; H04N 21/4756; H04N 21/6125; H04N 21/8173; H04N 21/23418; H04N 21/2353; H04N 21/4438; H04N 21/47205; H04N 21/6405; H04N 21/4126; H04N 21/44222; H04N 21/4532; H04N 21/47; H04N 21/2221; H04N 21/2225; H04N 21/23424; H04N 21/44008; H04N 21/4758

See application file for complete search history.

(56) References Cited

U.S. PATENT DOCUMENTS

| 2013/0057585 | A1 | 3/2013 | Ahmad Athsani et al. |
| 2013/0145248 | A1 | 6/2013 | Friedlander et al. |
| 2014/0063174 | A1 | 3/2014 | Junuzovic et al. |
| 2014/0215512 | A1* | 7/2014 | Maruyama ....... H04N 21/44008 725/34 |

OTHER PUBLICATIONS

Smith, "Idea-Generation Techniques: A Formulary of Active Ingredients", Journal of Creative Behavior, vol. 32, No. 2, 1998, pp. 107-133.
Smith, "Towards a Logic of Innovation", The International Handbook on Innovation, 2003, pp. 347-365.
Extended European Search Report received for corresponding European Patent Application No. 16172627.8, dated Sep. 1, 2016, 7 pages.
International Search Report and Written Opinion received for corresponding Patent Cooperation Treaty Application No. PCT/FI2017/050393, dated Jul. 6, 2017, 13 pages.
Office Action received for corresponding European Patent Application No. 16172627.8, dated Jul. 19, 2018, 8 pages.
Office Action received for corresponding European Patent Application No. 16172627.8, dated Mar. 28, 2019, 7 pages.

* cited by examiner

APPARATUS AND ASSOCIATED METHODS

RELATED APPLICATION

This application was originally filed as Patent Cooperation Treaty Application No. PCT/FI2017/050393 filed May 24, 2017 which claims priority benefit to EP Patent Application No. 16172627.8, filed Jun. 2, 2016.

TECHNICAL FIELD

The present disclosure relates to the field of user interaction with video imagery of an event, associated methods, computer programs and apparatus. Certain disclosed aspects/examples relate to virtual reality.

BACKGROUND

While watching a live event audience members or other people present at the event may wish to comment on the event. It may be desirable to present those comments to a user watching live or recorded video imagery of the event.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
  at least one processor; and
  at least one memory including computer program code,
  the at least one memory and the computer program code configured to, with the at least one processor, cause the apparatus to perform at least the following:
  in respect of video imagery of an event at which one or more commenting users are present and have submitted comments, a location of the or each of the one or more commenting users visible in the video imagery;
  based on a current view of the video imagery provided for display to a user and at least one comment of the one or more commenting users, the at least one comment having location information associated therewith, the location information indicative of one or more of (i) the location, at the time of making the comment, of the commenting user who submitted the comment at the event, (ii) a location, at the event, specified by the commenting user who submitted the comment at the event;
  provide for display of the comment overlaid over the current view of the video imagery, the comment displayed in the current view of the video imagery at a position that corresponds to the location information.

In one or more embodiments, the video imagery comprises virtual or augmented reality content configured to provide a virtual or augmented reality space for viewing in virtual or augmented reality, and wherein the current view of the video imagery comprises a virtual or augmented reality view presented to the user for viewing of the video imagery displayed in the virtual or augmented reality space.

In one or more embodiments, the comment has time information associated therewith, the time information indicative of one or more of (i) the time during the event at which the commenting user submitted the comment at the event; (ii) a time, occurring within the temporal duration of the event, specified by the commenting user who submitted the comment at the event; (iii) a time during the event determined from analysis of the context of the wording of the comment; (iv) a time during the event at which the commenting user created the comment; and (iv) where the comment comprises audio or video media, a time during the event determined from a time of recording of the audio or video media; and the apparatus is caused to provide for display of the comment for a time period less than a total duration of the video imagery and corresponding to the time information.

In one or more embodiments, the time information includes commenting user specified duration information comprising the duration of time for which the comment should be displayed.

In one or more examples, the apparatus provides for display of the comments for a predetermined duration less than the duration of the event.

In one or more examples, the apparatus provides for repositioning of the comment as displayed to the user as a function of the duration the comment has been displayed. In one or more examples, the comments may be repositioned such that they appear to float away as they age.

In one or more examples, the context analysis may comprise identification of keywords in the comment to associate it with an occurrence at the event. For example, for an event comprising a rock music concert, a comment that reads "Amazing pyrotechnics! #fire" may be assigned time information corresponding to the occurrence of a pyrotechnic show during the concert. In one or more examples, a list of time-stamped occurrences during the event may be provided and keywords from the comments matched to the occurrences in the list for determination of the time information. If the comment was an audio comment, speech to text conversion may be used to extract keywords. If the comment was an audio comment or a video comment, the context analysis may comprise analysing background audio of the comment to compare to known audio that occurred at the event to temporally place the comment during the event. In one or more examples, in the absence of a time specified by the commenting user, the time information may be based on one or more of context analysis or the time of submitting the comment.

In one or more examples, the location information comprises metadata of the comment.

In one or more examples, the location, at the time of making the comment, of the commenting user who submitted the comment at the event is derived from one or more of; (i) a satellite based positioning system, (ii) a land based positioning system, (iii) an indoor positioning system, (iv) a seat number at the event, (v) a designated area of the space in which the event is held.

In one or more embodiments, the location information specified by the commenting user comprises an (optionally moving) object appearing in the video imagery; and the apparatus is caused to provide for display of the comment at a position that corresponds to the location of the (optionally moving) object as its position in the video imagery over time changes over time.

In one or more examples, the moving object comprises one or more of a person, vehicle, performer, animal or other object. Thus, for an event comprising a football match, the commenting user may comment "Fantastic footwork" and specify the location, i.e. the focus of the comment, as "Player 13 of the Blue Team". The apparatus may then provide for display of the comment overlaid near Player 13 when visible in the video imagery or virtual reality view, the comment following the movements of Player 13 around the football pitch. Accordingly, one or more objects appearing in the video imagery or virtual reality content may be location tracked and available for selection by the commenting user when composing the comment or the location information relating to the moving object may be assigned later based on analysis of the comment.

In one or more embodiments, the comment has focus information associated therewith, the focus comprising an object or occurrence at the event to which the comment is directed; and the apparatus is caused to provide for display of the comment with one or more of; (i) a focus indicator showing at least the direction in the visual imagery corresponding to the focus information and (ii) a location in the visual imagery based on the focus information.

In one or more examples, the comment has focus-direction information associated therewith, the focus-direction comprising the direction at the event to which the comment is directed; and the apparatus is caused to provide for display of the comment with a focus-direction indicator showing the direction in the video imagery corresponding to the focus-direction information. Thus, the focus information may comprise focus-direction information.

In one or more embodiments, the focus-direction information may be one or more of (i) specified by the commenting user who submitted the comment at the event and (ii) determined from the orientation of an electronic device used by the commenting user to submit the comment at the time the comment was submitted.

In one or more embodiments, the one or more comments comprise one or more of;
  (i) text comment;
  (ii) photograph comment;
  (iii) picture comment;
  (iv) audio comment;
  (v) video comment;
  (vi) expression of a reaction to the event, such as "like", "love", "dislike", "hate"; and
  (vii) expression of a vote related to the event.

In one or more embodiments, the comment comprises one or more of an audio comment and a video comment, recorded by the commenting user, and wherein the apparatus is caused to provide for display of the comment by way of an activatable icon configured to, on user actuation, provide for playback of the audio or video comment. In one or more examples, the comment comprises one or more of an expression of a reaction and an expression of a vote related to the event, and wherein the apparatus is caused to provide for display of the expression by way of an icon representative of the reaction or vote.

In one or more embodiments, the comment includes audio content and the apparatus is caused to provide for playback of the audio content with a spatial audio effect, such that the perceived direction of the source of the audio content relative to the video imagery corresponds to the location information.

In one or more examples, the use of spatial audio may be used when the video imagery comprises virtual reality content. In one or more examples, when spatial audio is provided based on the direction of the virtual reality view or augmented reality viewing direction, the apparatus is caused to provide for playback of the audio content of the comment with an audio width, comprising the direction of the VR or AR view over which the audio content is heard above a threshold, dependent on the number of comments having audio content in the view provided to the user. Thus, when there are a lot of comments, the apparatus may require the user to look more directly at a location of the comment to hear the audio content at a higher volume. It will be appreciated that the playback of multiple audio comments may create a confusing audio space and therefore controlling the volume of the audio content with the viewing direction such that the user needs to look more closely at the location of a comment to hear its audio content clearly, may simplify the audio space.

In one or more embodiments, the apparatus is caused to provide for display of, prior to display of the comment, an activatable comment icon indicative of a comment being available for presentation to the user, the apparatus configured to, on user actuation of the activatable comment icon, provide for the presentation of the comment.

In one or more embodiments, the comment comprises at least a first comment part having a first direction associated therewith and a second comment part having a second direction associated therewith; and the apparatus is caused to provide for display of the first comment part when the view of the video imagery is oriented in a direction substantially corresponding to the first direction and the second comment part when the view of the video imagery is oriented in a direction substantially corresponding to the second direction.

In one or more embodiments, the apparatus is caused to provide for display of a user-activatable link along with the one or more comments, the link comprising a reference to a temporal portion of the event, and upon activation of the link, provide for a replay of the temporal portion of the event.

In one or more examples, the one or more comments are provided for display with a stereoscopic effect to the user. Thus, the location of the comments as displayed to the user may be easier to associate with the location information i.e. the intended position for the comment.

In one or more examples, upon a change in point of view of the video imagery to a second point of view or viewing direction, the position of the one or more comments is provided for display to correspond to the locations visible in the video imagery from the second point of view or viewing direction.

In one or more examples, the display of the one or more comments is dependent on a user selection such that the user can display or hide the comments.

In one or more examples, the video imagery is live content or pre-recorded content.

In one or more examples, the one or more comments are obtained from a social media platform.

In a further aspect there is provided an apparatus comprising:
  at least one processor; and
  at least one memory including computer program code,
  the at least one memory and the computer program code configured to, with the at least one processor, cause the apparatus to perform at least the following:
  in respect of video imagery of an event at which one or more commenting users are present, a location of the or each of the one or more commenting users visible in the video imagery of the event;
  based on at least one comment of the one or more commenting users;
  provide for the association of the comment with the video imagery with location information, the location information indicative of one or more of (i) the location, at the time of making the comment, of the commenting user who submitted the comment at the event, and (ii) a location, at the event, specified by the commenting user who submitted the comment at the event, thereby enabling for display of the comment overlaid over the video imagery such that it is displayed in the video imagery at a position that corresponds to the location information.

In a further aspect there is provided a method, the method comprising;
  in respect of video imagery of an event at which one or more commenting users are present and have submitted comments, a location of the or each of the one or more commenting users visible in the video imagery;
  based on a current view of the video imagery provided for display to a user and at least one comment of the one or more commenting users, the at least one comment having location information associated therewith, the location information indicative of one or more of (i) the location, at the time of making the comment, of the commenting user who submitted the comment at the event, (ii) a location, at the event, specified by the commenting user who submitted the comment at the event;
  providing for display of the comment overlaid over the current view of the video imagery, the comment displayed in the current view of the video imagery at a position that corresponds to the location information.

In a further aspect there is provided a method, the method comprising;
  in respect of video imagery of an event at which one or more commenting users are present, a location of the or each of the one or more commenting users visible in the video imagery of the event;
  based on at least one comment of the one or more commenting users;
  providing for the association of the comment with the video imagery with location information, the location information indicative of one or more of (i) the location, at the time of making the comment, of the commenting user who submitted the comment at the event, and (ii) a location, at the event, specified by the commenting user who submitted the comment at the event, thereby enabling for display of the comment overlaid over the video imagery such that it is displayed in the video imagery at a position that corresponds to the location information.

In a further aspect there is provided a computer readable medium comprising computer program code stored thereon, the computer readable medium and computer program code being configured to, when run on at least one processor, perform at least the following:
  in respect of video imagery of an event at which one or more commenting users are present and have submitted comments, a location of the or each of the one or more commenting users visible in the video imagery;
  based on a current view of the video imagery provided for display to a user and at least one comment of the one or more commenting users, the at least one comment having location information associated therewith, the location information indicative of one or more of (i) the location, at the time of making the comment, of the commenting user who submitted the comment at the event, (ii) a location, at the event, specified by the commenting user who submitted the comment at the event;
  providing for display of the comment overlaid over the current view of the video imagery, the comment displayed in the current view of the video imagery at a position that corresponds to the location information.

In a further aspect there is provided a computer readable medium comprising computer program code stored thereon, the computer readable medium and computer program code being configured to, when run on at least one processor, perform at least the following:
  in respect of video imagery of an event at which one or more commenting users are present, a location of the or each of the one or more commenting users visible in the video imagery of the event;
  based on at least one comment of the one or more commenting users;
  providing for the association of the comment with the video imagery with location information, the location information indicative of one or more of (i) the location, at the time of making the comment, of the commenting user who submitted the comment at the event, and (ii) a location, at the event, specified by the commenting user who submitted the comment at the event, thereby enabling for display of the comment overlaid over the video imagery such that it is displayed in the video imagery at a position that corresponds to the location information.

In a further aspect there is provided an apparatus, the apparatus comprising means,
  in respect of video imagery of an event at which one or more commenting users are present and have submitted comments, a location of the or each of the one or more commenting users visible in the video imagery;
  based on a current view of the video imagery provided for display to a user and at least one comment of the one or more commenting users, the at least one comment having location information associated therewith, the location information indicative of one or more of (i) the location, at the time of making the comment, of the commenting user who submitted the comment at the event, (ii) a location, at the event, specified by the commenting user who submitted the comment at the event;
  for providing for display of the comment overlaid over the current view of the video imagery, the comment displayed in the current view of the video imagery at a position that corresponds to the location information.

In a further aspect there is provided an apparatus, the apparatus comprising means,
  in respect of video imagery of an event at which one or more commenting users are present, a location of the or each of the one or more commenting users visible in the video imagery of the event;
  based on at least one comment of the one or more commenting users;
  for providing for the association of the comment with the video imagery with location information, the location information indicative of one or more of (i) the location, at the time of making the comment, of the commenting user who submitted the comment at the event, and (ii) a location, at the event, specified by the commenting user who submitted the comment at the event, thereby enabling for display of the comment overlaid over the video imagery such that it is displayed in the video imagery at a position that corresponds to the location information.

The present disclosure includes one or more corresponding aspects, examples or features in isolation or in various combinations whether or not specifically stated (including claimed) in that combination or in isolation. Corresponding means and corresponding functional units (e.g. single direction of arrival locator) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

While watching a live event audience members or other people present at the event may wish to comment on the event. The event may be a music concert, a sports event or a theatre production or any other event at which audience members are present. The event may be captured by cameras for presenting live or recording and presenting later to other users. The event may be captured for display in virtual reality or augmented reality and therefore the user consuming the virtual/augmented reality content may be able to look around the event and at audience members, for example. The effective making and display of comments for an event, and particularly in virtual reality content, may be desirable.

Figure 1:
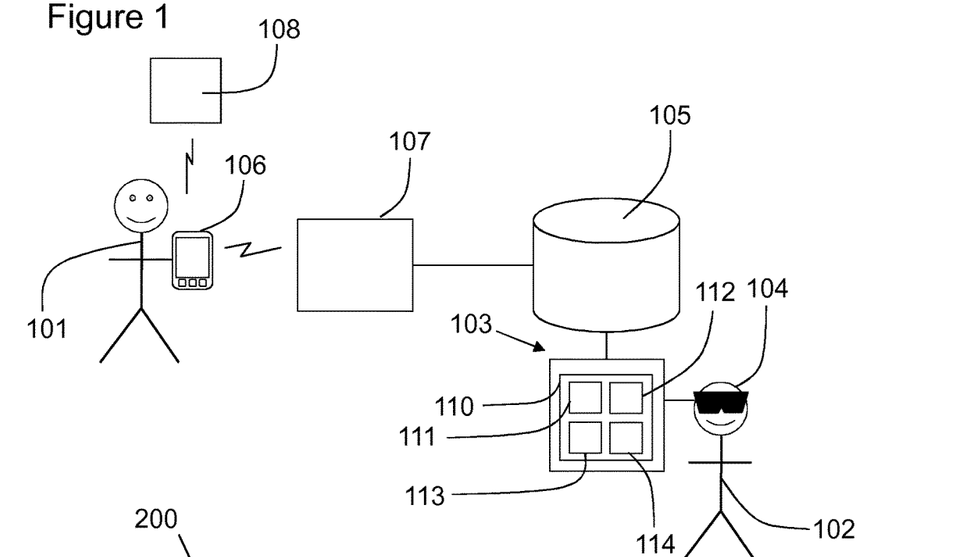
FIG. 1 illustrates an example apparatus, a user consuming content and a commenting user using an electronic device to submit a comment.

FIG. 1 shows a commenting user 101 at an event, such as a music concert. The event is being captured by one or more cameras which are configured to capture video imagery of the event. The cameras may comprise virtual reality (VR) content capture devices for capturing virtual reality content of the event. Thus, the VR content capture devices may have a 360° field of view. The video imagery when presented as virtual reality content may be displayed to a user 102 in a virtual reality space for viewing in virtual reality. The video imagery of the VR content, in this example, is provided for display by a virtual reality apparatus (VR apparatus) 103 via a headset 104 containing displays to the user 102. As will be familiar to those skilled in the art of virtual reality, the movement of the user's head may be detected to enable them to look around the virtual reality space at the video imagery presented therein (other view direction control is possible). The location of the commenting user is visible in at least a portion of the video imagery.

The video imagery may be stored (which may include being stored transiently or temporarily) on a store 105. The VR apparatus 103 in this example, is configured to receive the video imagery, such as virtual reality content, from the store 105. The virtual reality content may be live content and the store 105 may represent a memory or buffer of a display or onward transmission path.

The commenting user 101 may submit a comment about the event via an electronic device 106. The electronic device 106 may provide location information with the comment or location information may be determined by another apparatus as described below. The location information is indicative of one or more of (i) the location, at the time of making the comment, of the commenting user 101 who submitted the comment at the event and (ii) a location, at the event, specified by the commenting user 101 who submitted the comment at the event.

The comment may be received by an apparatus, comprising a comment-receiving apparatus 107 for associating with the captured video imagery of the event. The comments and location information may be stored in the store 105 with the video imagery or as metadata thereof. The comment may also be posted to a social media platform 108. The comment-receiving apparatus 107 may comprise a server that cooperates with an "app" on the commenting user's electronic device. The comment-receiving apparatus 107 may, with the relevant privacy permissions granted, obtain comments from social media platforms.

An apparatus 110, which in this example is shown as part of the VR apparatus 103 (but could be independent thereof and in communication with whatever apparatus provides for display of the video imagery to the user 102) is configured to provide for display of the video imagery and of at least the comment of the commenting user 101. Accordingly, based on a current view of the video imagery provided for display to the user 102 by the VR apparatus 103 and the comment of the commenting user 101, the at least one comment having location information associated therewith, the apparatus 110 is configured to provide for display of the comment overlaid over the current view of the video imagery, the comment displayed in the current view of the video imagery at a position that corresponds to the location information. Thus, the comment may be displayed at a position to associate it with where in the video imagery the location specified in the location information is visible. Thus, if the location information indicated that the comment happened to be made from a location comprising a notional "Seating Block A" at the event or even seat "AW31", the comment is displayed in association with that seating block or seat, based on where that seating block or seat is visible in the video imagery.

The apparatus 110 and VR apparatus 103 may be configured to communicate with each other such that the apparatus 103 is able to determine what view of the video imagery is currently provided to the user 102. The apparatus 110 may receive the one or more comment made by the commenting user 101 in the form of metadata associated with the video imagery or VR content from the store 105. Accordingly, the apparatus 110 may provide instructions to the VR apparatus 103 to display the comments at an appropriate location in the view provided to the user 102 on the display of the headset 104 to associate the comment with the location information.

In a non-limiting example, the comment-receiving apparatus 107 may comprise a server and the electronic device 106 of the commenting user may comprise a smart phone.

An example of a general structure of the apparatus 110 will now be described and it will be appreciated that the structure could equally apply to the comment receiving apparatus 107 and electronic device 106. The apparatus 110 may comprise a processor 111, a memory 112, an input 113 and an output 114. In this embodiment, only one processor and one memory are shown but it will be appreciated that other embodiments may utilise more than one processor and/or more than one memory (e.g. same or different processor/memory types).

In this embodiment the apparatus 110 is an Application Specific Integrated Circuit (ASIC) for a portable electronic device, optionally with a touch sensitive display. The processor 111 and memory 112 may provide the functionality of the VR apparatus 103. In other embodiments the apparatus 110 can be a module for such a device, or may be the device itself, wherein the processor 111 is a general purpose CPU of the device and the memory 112 is general purpose memory comprised by the device.

The input 113 allows for receipt of signalling to the apparatus 110 from further components, such as the VR apparatus 103 and the store 105 and components of a portable electronic device (like a touch-sensitive or hover-sensitive display) or the like. The output 114 allows for onward provision of signalling from within the apparatus 110 to further components such as a VR apparatus 103, display screen, speaker, or vibration module. In this embodiment the input 113 and output 114 are part of a connection bus that allows for connection of the apparatus 110 to further components.

The processor 111 is a general purpose processor dedicated to executing/processing information received via the input 113 in accordance with instructions stored in the form of computer program code on the memory 112. The output signalling generated by such operations from the processor 111 is provided onwards to further components via the output 114.

The memory 112 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 111, when the program code is run on the processor 111. The internal connections between the memory 112 and the processor 111 can be understood to, in one or more example embodiments, provide an active coupling between the processor 111 and the memory 112 to allow the processor 111 to access the computer program code stored on the memory 112.

In this example the input 113, output 114, processor 111 and memory 112 are all electrically connected to one another internally to allow for electrical communication between the respective components. In this example the components are all located proximate to one another so as to be formed together as an ASIC, in other words, so as to be integrated together as a single chip/circuit that can be installed into an electronic device. In other examples one or more or all of the components may be located separately from one another.

An input (not shown) of the electronic device 106 may be configured to receive comments from a user interface of the electronic device 106. The electronic device 106 may be configured to receive location data from a location determination module of the electronic device 106, such as a satellite positioning module (e.g. GPS), a High Accuracy Indoor Positioning system (HAIP), a Bluetooth® LE based positioning system or from commenting-user input of their location or a specified location at the event. An output (not shown) of the electronic device 107 may provide the comment and location information to the server 107. An input of the server 107 may receive comments from the commenting user 101 via the electronic device 106. The server 107 may be configured to provide for determine of location information based on the context of the comment. An output of the server 107 may provide for association of the one or more comments with the VR content, such as by recording comment data (such as metadata) with the VR content in the store 105 for onward distribution and subsequent display by the VR apparatus 103.

Figure 2:
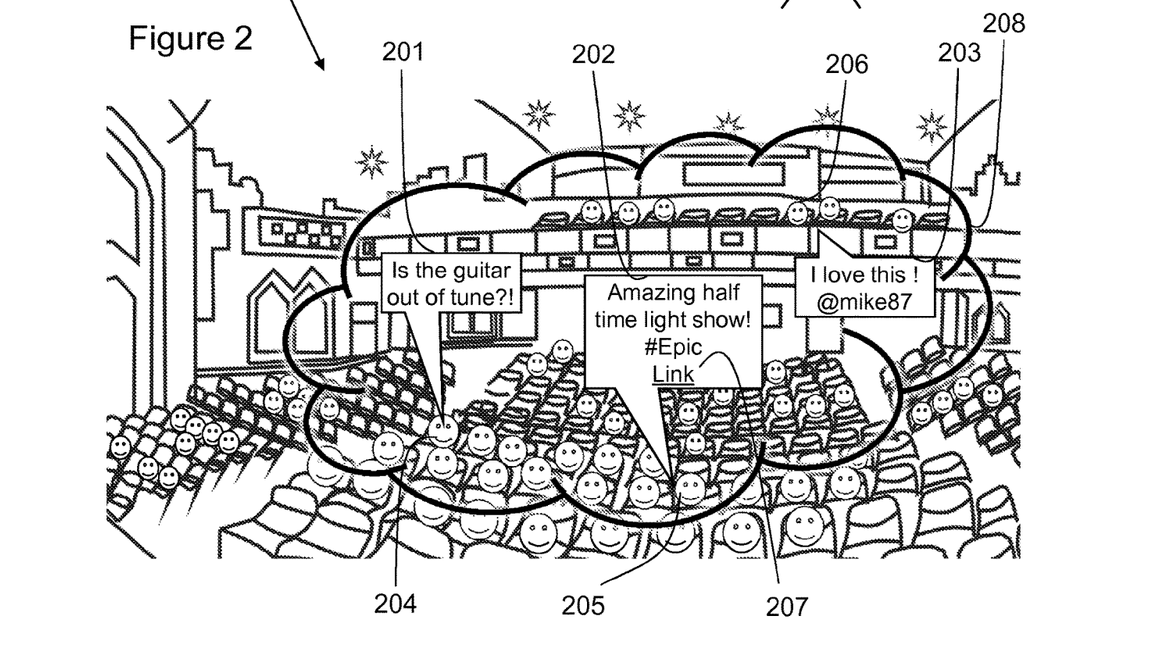
FIG. 2 illustrates a view of the video imagery showing comments placed in the video imagery at locations corresponding to location information.

FIG. 2 shows a current view 200 (virtual reality view in this example) of the video imagery provided for display to the user 102. The current view is of the audience at a music event. The current view 200 includes three comments overlaid thereon comprising a first comment 201, a second comment 202 and a third comment 203. The comments 201, 202 and 203 are positioned such that they appear in the current view a location that corresponds to their associated location information.

In this example, the first comment 201 has location information indicating that the comment was made by a first commenting user 204 in seat "D1" for example. In one example, the seat number may be provided by the user or determined from a registration procedure that may link the commenting user 204 to the seat assigned to them at the event. The second comment 202 has location information indicating that comment was made from a geographic location determined by a locating module of the smart phone 106 of commenting user 205. The geographic location may be a global position or an indoor position relative to an indoor positioning system among other examples. The third comment 203 of a third commenting user 206 has location information determined from the comment itself. The third commenting user has included their social media name in the message "@mike87". The electronic device (not shown) of the third commenting user 206 and/or the server 107 may (with appropriate privacy permissions granted) provide for association of the identity of the third commenting user 206 from their social media name with the name of a ticket holder at the event and thus with a seat number assigned to that person, the location information comprising the seat number. It will be appreciated that there are many ways for the location information associated with the comment to be obtained either such as from one or more of i) commenting user entry, ii) determination by an electronic device used to submit the comment of the commenting user iii) determination by a positioning system associated with an electronic device of the commenting user or a server configured to receive the comments and iv) from the wording or content of the comment itself.

In one or more examples, the location information specified by the commenting user 101 comprises an object, such as a person on stage. The object may be an object capable of moving around (a performer at a music concert, for example) or a stationary object (a goal post at a football event, for example). Thus, the location information need not specify a fixed place but may reference an object. The apparatus 110 may then be caused to provide for display of the comment at a position that corresponds to the location of the object in the video imagery.

Thus, the server 107 and/or apparatus 110 may provide for visual analysis of the video imagery to identify objects referenced in the location information of the comments such that the apparatus 110 may provide for display of appropriately positioned comments to the user 102. Thus, a comment may refer to "backing dancer in a shark outfit" and from the context of the comment the appropriate backing dancer may be identified in the video imagery and the location information of the comment provided to enable the comment to be displayed in association with the backing dancer. Thus, the location information may identify the object such that the apparatus 107 is able to determine the location of said object or the location information may comprise the location of the object as determined by an object identification and location determination process performed by another apparatus, such as server 107.

In one or more examples, the location of one or more objects at the event are tracked and event-object position information provided for correlating with an object referenced in a comment provided by the commenting users 101. For example, the players of a sports team may be provided with location trackable tags that enable the position of the objects and the corresponding position in the video imagery to be determined.

The apparatus (e.g. smartphone 106 in combination with server 107) used by the commenting user to make the comment may provide a list of objects, based on the event-object position information, that the user may select from for generation of location information of their comment that specifies an object or location thereof.

Thus, the location information may make reference to a single location or a plurality of locations over time.

The apparatus 110 may use location mapping information that maps the locations visible in the video imagery to locations (geographical locations, seat numbers, block numbers, objects etc.) at the event to provide for appropriate positioning of the comments according to the location information. The location mapping information may be predetermined. It will be appreciated that the form in which the location is specified in the comment affects what "translation" is required (e.g. provided by the location mapping information) such that the location of the location information can be related to a particular position in the video imagery that features that location. If the location information is determined by a positioning system located at the event, no "translation" may be needed as the location information may be provided relative to the viewpoint of the video imagery of the event being captured and may therefore be usable when providing for display of the video imagery. Further, as the VR view 200 moves, such as with camera movements when the VR content was captured or due to the user 102 looking around, the position of the comments 201, 202, 203 or part thereof is updated to provide for continued association of the comment with the location information in the VR view 200.

The second comment 202 includes a user-activatable link 207. The commenting user 205 may have provided media or an internet based link relevant to their comment, which may be activated by the user 102 activating the link. The link may reference one or more of i) a video of the event ii) commenting-user captured media iii) a website.

It will be appreciated that the view 200 is a temporal snapshot of an event. The comments 201, 202, 203 may have time information associated therewith, the time information indicative of one or more of (i) the time during the event at which the commenting user created or submitted the comment at the event and (ii) a time, occurring within the temporal duration of the event, specified by the commenting user who submitted the comment at the event and (iii) a time during the event determined from analysis of the context of the wording of the comment and (iv) where the comment comprises audio or video media, a time during the event determined from a time of recording of the audio or video media. The apparatus 110 may be caused to provide for display of the comment for a time period less than a total duration of the virtual reality content and corresponding to the time information. Thus, the comment may not be displayed until the time information indicates.

The comments 201, 202, 203 may well relate to occurrences during the event, such as particular song during a music performance, or a particular goal or foul during a sporting event. Thus, the comments may include time information so that the apparatus 110 may provide for display of the comments at the opportune time. Thus, during the playback of pre-recorded video imagery, the comment may be displayed at an appropriate time point into the event. The time information may comprise the time at which the user submitted or created the comment. Accordingly, an electronic device of the commenting user 204, 205, 206 or the server 107 may timestamp the comments as they are received. This time may then be used, relative to the time elapsed during the event, when providing the comments for display to the user 102. The commenting user 204, 205, 206 may specify a time with their comment and the specified time may comprise the time information for displaying the comment. For example, the commenting user may write a comment stating "My favourite song!!" after the particular song has finished, for example. The user may be then able to specify that their comment relates to an occurrence (i.e. the performance of their favourite song) 3 minutes prior, for example. Accordingly the time information may therefore indicate a time different to the time of creation or of submitting the comment. When the apparatus 110 provides for display of such a comment, it therefore may be displayed at a time during the commenting user's favourite song rather than after it by virtue of the time information derived from a user-specified time. Other examples of comments provided for display at a time, relative to the event, different to the time the comment was made during the event are set out below.

The second comment 202 states "Amazing half time light show! #Epic". An electronic device of the second commenting user 205 or the server 107 or other apparatus may be configured to analyse the context of the wording of the comment to determine time information. In this example, the server 107 may identify the words "half time" or "light show" to an occurrence during the event. Thus, event-occurrence information comprising a description of occurrences during the event may be provided (automatically or manually) and a match between the comment wording and the event-occurrence information may be used to temporally place a comment during the event. It will be appreciated that any technique for comment wording context analysis may be used to provide the time information for association with the comment 202. Accordingly in this example, the time information may place the comment during the half time light show even if the comment was made later during the event.

For audio or video comments, a time during the event may be determined from metadata of the audio or video file specifying a time of recording of the audio or video media, which may be commonly appended when recording audio or video on electronic devices, such as smartphones. Otherwise, the audio or video comment may be analysed, such as by audio analysis of background sounds, to temporally place the audio or video to a time during the event. Thus, as the event is being captured for the VR video imagery, sound of the event is recorded and can be compared to sounds that are audible in the commenting user's audio/video comments. It is expected that given the commenting user is present at the event, the audio or video comment will contain audio that can be compared to audio for which the time during the event is known. This may therefore temporally place the video or audio during the event. This time may then comprise the time information of the comment.

The duration for which the comment applies may also be commenting-user-specified or determined from the context. The time information may include duration information indicative of the amount of time during the event for which a comment is relevant. The apparatus 107 may, based on the duration information of the time information, provide for display of the comments at the appropriate time and for an appropriate duration. For a fast paced sport such as motor racing, the comment "Great overtaking" may be given a short duration by the commenting user because of many overtaking manoeuvres being performed and they wish their comment to understood to refer to a particular manoeuver. The duration may be determined by context analysis of the wording or content of the comment. For example, at a sporting event, a comment "Great offensive play from player 2" may be assigned duration information for the time period that "player 2" is in the opponent's half of a playing field, determined from statistical sporting data of the particular sporting event.

It will be appreciated that for events where many commenting users are submitting comments the display of the comments in the current view may become cluttered or confusing. Accordingly, the apparatus 107 may provide for filtering of the comments based on predetermined or user 102 specified criteria. For example, the user may only wish to see comments about a particular player in a sporting event or a particular band member at a music event. Further, as a comment ages it may be displayed differently, such as over the period specified by the duration information. For example, the comment may be displayed with an effect such that it appears to the user 102 to fade away and/or to float away from its original position. While floating away, the comment may include a lead line or other indicator connecting it to the location specified in its location information. In one or more examples, the comment may be positioned true to the location information for a predetermined initial period and may then move away as it ages. This may make room for more recent comments to display to the user 102.

When performing context analysis to determine the location to add as the location information or the time to add as the time information, there may be a plurality of candidate results. For example, the word "half time" may refer to the half time interval during the musical performance of the event or it may refer to a lyric within one of the songs performed at the event. One or more of the apparatus 107 or electronic device 106 may provide for display of one or more candidate times/locations based on the context analysis for selection by the user, the time/location information of the comment based on the selection of the commenting user. Thus, the app on the electronic device 106 of the commenting user 101 may present the candidate results as options for selection. The commenting user selection may then be reported to the server 107.

The location information, time information and/or duration information may be stored as metadata, along with or as a property of the comment.

The comments 201, 202, 203 are provided as a comment cloud 208 in FIG. 2. The cloud may comprise a translucent effect. The comments 201, 202, 203 may be provided with or without the additional cloud graphic or translucent effect. The comments may be presented as a comment layer which may be displayed or hidden from view by the user 102. Accordingly, the apparatus may provide for display of the comments based on a user-request to provide for overlaying of the comment layer on the video imagery. It will be appreciated that there may be a link between the locations visible in the video imagery and where in the comment layer the comments are provided for display.

Figure 3:
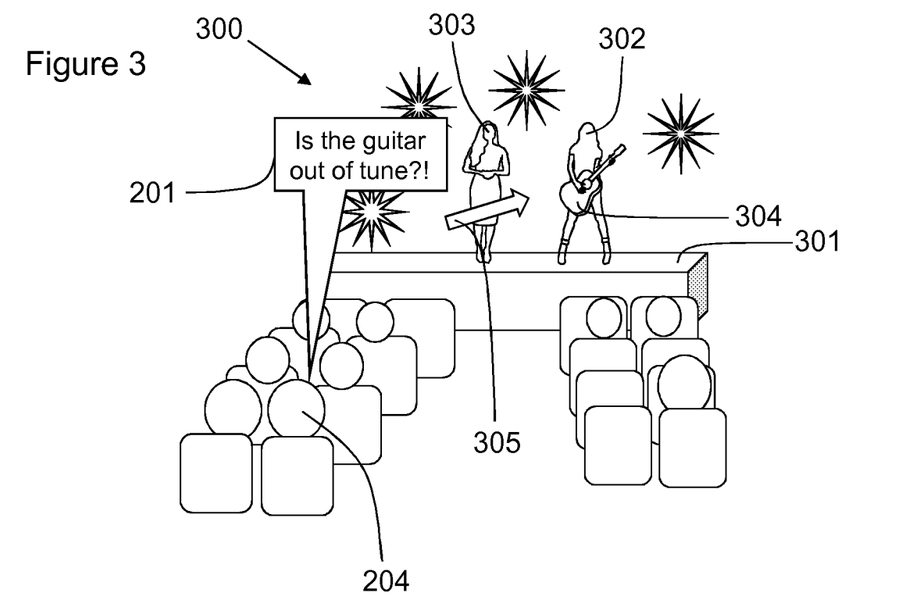
FIG. 3 illustrates the scene shown in FIG. 2 from a different point of view.

FIG. 3 shows a further current view 300 at a same or similar time to the view shown in FIG. 2 from a different point of view. In this example the point of view of the current view 300 is towards the back of the event looking towards a stage 301 where two band members 302, 303 are performing. A first 302 of the band members is playing a guitar 304.

The location indicated by the location information of the first comment 201 is visible in this further current view 300. In this example, the first comment 201 is shown overlaid to associate it with where the first commenting user 204 appears in the current view 300. In this example, when the VR view changes from view 200 to view 300, the position of the comment overlaid on the video imagery is updated, which in this example is to the position of seat "D1".

FIG. 3 also shows a focus indicator 305, which was omitted from the view of FIG. 2 for clarity. The focus indicator 305 shows to whom or what the comment is directed, i.e. the focus of the comment. In this instance, the first comment 201 comprising "Is the guitar out of tune?!" is directed towards the first 302 of the band members, who is playing a guitar 304. The focus indicator may be based on focus information of the comment, the focus information indicative of a thing, object or occurrence at the event to which the comment is directed.

The focus of a particular comment may be specified by the commenting user 204. The focus may comprise a direction determined from the orientation of an electronic device 106 used by the commenting user 204 to submit the comment at the time the comment was submitted. Thus, the commenting user 204 may use their smartphone (or other electronic device) to make the comment and data from a compass of the smartphone or analysis of the images captured by a camera of the smartphone may be used to determine the focus-direction of the comment, which may be appended to the comment for sending to the server 107. The focus may be specific, e.g. to an object or person or may be general e.g. towards the stage or away from the stage. Thus, the images captured by the camera of the electronic device may be compared to known features of the space in which the event is held to determine the direction the camera was being pointed. If the comment was directed towards performers on a stage, the focus-direction may point towards the stage. If the comment was about the audience, the focus-direction may point towards the audience.

In one or more examples, the focus may be selected from a list of options where the options comprise predetermined foci for comments. For example, with knowledge of the players of a football game or the performers at a festival, a list of predetermined foci can be generated and at least a subset thereof provided for selection by the commenting user. The focus and/or the list of options may be determined from context analysis of the content of the comment.

The focus indicator 305 and, correspondingly, the focus information may provide one or more of i) a direction towards the object or occurrence that is the comment's focus ii) a location at the event that is the comment's focus and iii) an object or occurrence (e.g. a scene in a theatrical performance) at the event that is the comment's focus.

If the focus information comprises a direction or a location then the apparatus 110 may provide for display of a focus indicator in the appropriate direction given the direction of the view in the video imagery. If the focus information comprises an object, the apparatus 110 may provide for identification of the location of the object with reference to the event-object position information and/or provide for visual identification of the object or occurrence of the focus information in the visual imagery.

The focus indicator 305, in this example, comprises an arrow pointing towards the focus 302 of the comment 201. However, it will be appreciated that the focus indicator may take one or more other forms, such as an arrow pointing towards the general direction of the focus, colour or pattern coded "pins" matching the focus of the comment to the comment, animations showing the connection between the comment and the focus, colour coding, pattern coding and any other icon, sound or animation that provides the user 102 with an indication of to what or to whom the comment is directed. In one or more examples, the focus indicator comprises the orientation of the comment relative to the video imagery. The comment may be displayed as a planar graphical element with the text of the comment presented across the planar graphical element, as shown in FIGS. 2 and 3. In the example of FIG. 2 the comments are all displayed such that a normal to the plane in which the planar graphical element of each comment lies points towards the viewer 102. Accordingly, all of the comment 201, 202, 203 appear "face on" to the user 102. However, the focus of the comment may be presented such that the normal to the plane in which the planar graphical element lies points towards the focus. Thus, the comment 201 may be oriented in space as shown in FIG. 3, even when shown from a different point of view. Thus, with the orientation relative to the video imagery shown in view 300 the comment can be viewed and the focus 302 of the comment appears behind it, such that the normal of the plane points (generally) towards band member 302.

Figure 4:
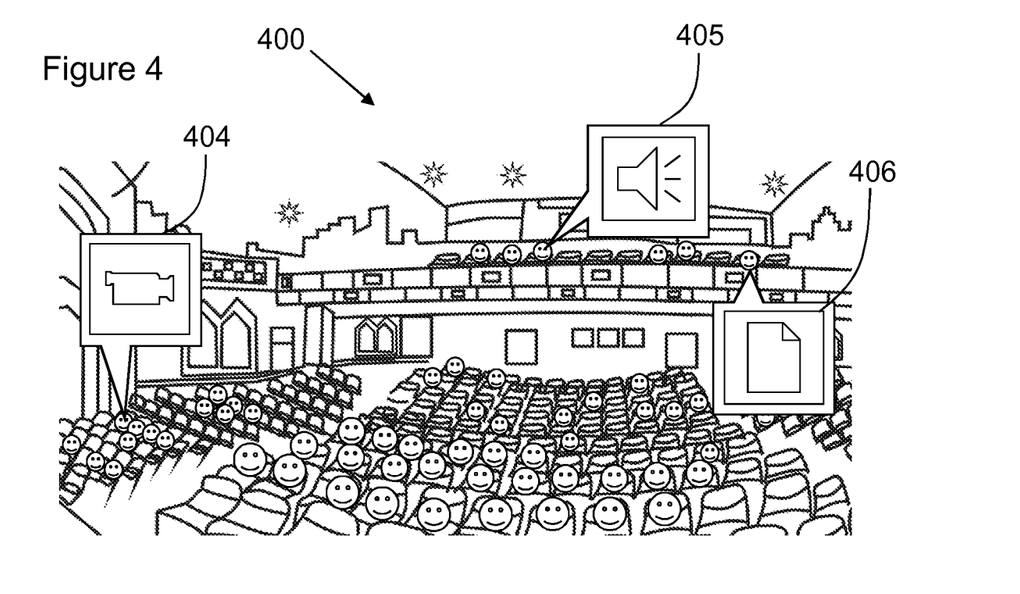
FIG. 4 illustrates a view of the video imagery showing video and audio based comments presented as an activatable icon.

FIG. 4 shows a view 400 of the video imagery having three comments displayed at locations according to the location information of the comment, the comments comprising a fourth comment 404, a fifth comment 405 and a sixth comment 406.

The comments 404, 405, 406 may comprise text as shown in the earlier figures or they may comprise multimedia, such as video or audio. Accordingly, the commenting user 101 may record audio or video using their electronic device 106 and submit that audio or video as a comment. Comments may also comprise an expression of a reaction to the event, such as "like", "love", "dislike", "hate". Accordingly, the "expression" comment may be encoded as a text string or in any other way such that the apparatus 110 can display the expression appropriately. For example, the apparatus 110 may provide for display of a predetermined icon to represent the expression of a reaction. For example, for a comment expressing the commenting user liking the event, a "thumbs-up" icon may be displayed as the comment, positioned according to the location information for that "expression" comment. Similar to the display of an expression of a reaction, the comment may comprise the expression of a vote related to the event. For example, at a talent show based event, the audience may be invited to vote to keep or reject a particular act. The commenting users of the audience may express their vote as their comment, which may then be provided for display by the apparatus 110.

The audio and/or video based comments may automatically play in the view to the user 102.

In the example of FIG. 4, the fourth comment 404 comprises a video comment, the fifth comment 405 comprises an audio comment and the sixth comment 406 comprises a text based comment. Each of the comments is provided for display as an activatable comment icon. Thus the user 102 may be required to provide for selection of one or more of the activatable comment icon to view the comment. The use of activatable comment icons may be convenient for audio or video based comments. The use of activatable comment icons for text based comments may be useful for times when many comments are being made by the commenting users and the view 400 may become cluttered. Thus, the icons could be made smaller in size than the display of the full text of the comment. The icons may include a preview of the comment content they will provide on activation, such as a frame of the video or key words from a text based comment or audio comment (obtained from speech to text conversion). The icon may indicate the type of comment as exemplified in FIG. 4, where the icons comprise a video camera for the video based comment, a speaker for the audio based comment and a page for the text based comment.

On user activation of the comment icon of comments 404, 405 the apparatus 110 is caused to provide for display of the comment by way of playback of the audio or video comment. For the text based sixth comment 406, the full text of the comment may be made available for viewing.

For a video based comment, the comment may be displayed as a picture in picture view of the video imagery of view 400 and a smaller window (not shown) showing the video based comment. In one or more examples, the video imagery may be interrupted and the view 400 replaced such that the video based comment may be displayed. On completion of the video based comment and/or at user 102 request, the video imagery of view 400 may resume.

For audio based comments (including the audio of video based comments), the audio of the video imagery of view 400 may be muted or the volume reduced or the audio of the comment may be played at an audible volume relative to other audio. In one or more other examples, when the video imagery comprises VR content, the VR content may include spatial audio which is presented such that elements of the audio are perceived to originate from a particular direction. The width of the audio field comprises the range of viewing directions the user must look in to be able to hear the spatial audio above a threshold. Thus, the user 102 may need to look in the general direction of the audio comment to hear it if the audio comment is presented with a wide audio field width and for audio presented with a narrow audio field width the user 102 may need to orient the view 400 more directly towards the direction that the audio originates. The audio field width may be actively controlled based on the density of audio based comments in a particular view 400. Thus, a narrower audio field width may be used when there are many audio comments and a wider audio field width may be used when there are fewer audio comments. Outside the audio field width the comment may be inaudible or played at a level below a threshold (perhaps only while visible in the view 400). When the user looks towards the comment and within the audio field width the comment may be played with an above threshold volume. This may ensure the audio space is not too confusing.

In one or more examples, the comment may be displayed to have multiple sides, with each side or comment part visible from different points of view and/or viewing directions (particularly but not exclusively when the video imagery comprises virtual reality content enabling the user to control a virtual reality view of the VR content in the virtual reality space). In one or more examples, a comment may be displayed with a first side visible when the view is towards the stage with a first comment part thereon and a second side with the second comment part thereon visible when the view is out over the audience from the stage visible from the point of view of the band members, for example.

Figure 5:
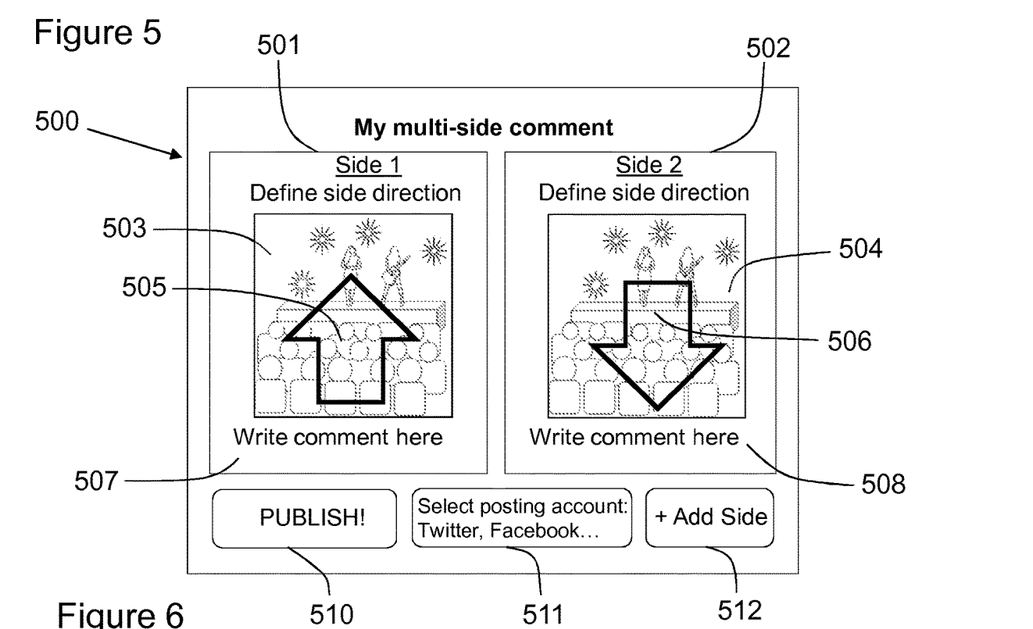
FIG. 5 illustrates an example screenshot of an app illustrating the submission of a comment comprising multiple parts and each part having a different focus direction.

As described above in relation to the display of the comment having a particular orientation relative to the video imagery to show its focus, FIG. 5 shows the creation of a comment having multiple sides. For a comment displayed with a particular orientation relative to the video imagery to show a focus of the comment, the comment may include different text, audio or video dependent on the angle from which the comment is viewed by user 102. In the example of FIG. 3, when viewed looking towards the stage 301, the comment 201 states "Is the guitar out of tune?". If the comment 201 were to have multiple sides, the side viewable from the point of view of the stage may read "Please tune your guitar!", as this would be (potentially) viewable by the band member 302. Thus, the comments may be provided with comment parts, each comment part having a focus (or viewing direction) associated therewith such that the comment parts are provided for display based on the angle from which the comment is viewed by the user 102. The apparatus may be configured to use a viewing direction provided in the view 300 (which may be provided by the VR apparatus) and comment part information associated with the comment to provide for display of one of the plurality of comment parts based on the viewing angle.

The comment part information may be provided by the commenting user 101 or determined from context analysis as described above in relation to determination of a comment focus. FIG. 5 shows a user interface 500 provided to the commenting user via the electronic device 106. The user interface 500 provides for creation of a two sided comment with "Side 1" specified in a left hand pane 501 and with "Side 2" specified in a right hand pane 502. A view 503, 504 from a camera of the electronic device is provided in each pane 501, 502 along with an arrow 505, 506 to show the direction in which each comment part will be visible when displayed to user 102. A text entry box 507, 508 is provided for each comment side, although video based and audio based comment parts may be provided in one or more other examples.

FIG. 5 further shows a "publish" button 510 for submitting the comment, such as to the server 107. A "posting account" button 511 is provided for selection of a social media account for further sharing the comment via social media. A "+Add Side" button 512 is provided for adding further comment parts to the comment, where each comment part is viewable from a different viewing direction.

The apparatus 110 may provide for receipt of at least one reply to a comment from the user 102. The apparatus 110 may provide for sending of the reply to the commenting user who made the comment. Accordingly, a log of commenting users and details to allow them to be contacted and their comments may be used to link and/or forward comment replies to the commenting users 101.

The server 107 and an application executed on the electronic device 106 of the commenting user 101 may act together to provide the comment receiving apparatus for submitting comments having location information associated therewith for display at corresponding locations in video imagery captured of the event at which the commenting user is present. The comments received by the apparatus 107, comprising the comment and location information associated therewith may include any combination of other information for control of the display of the comment to the user 102, such as focus information, focus-direction information, time information, duration information, comment part information.

The comment receiving apparatus 106, 107 may be configured to associate the comment and at least its location information with the video imagery so that the comment will be displayed overlaid at a location in the video imagery that corresponds to where the commenting user is visible for example (or more generally where the location information indicates). The association may comprise recording the comment and location information with the video imagery or providing a reference thereto. In one or more examples, associating may comprise providing links between the comments and the video imagery. It will be appreciated the form of the data providing the comments and the form of the data providing the video imagery may take many different forms and the "comment receiving" apparatus 106, 107 is required to provide a link between the two data sets such that the comments may be displayed in accordance with the location information.

The comment receiving apparatus 106, 107 may be configured to provide for interpretation of the location information and the video imagery to determine where in the video imagery a location referenced by the location information is visible, as described above. The point of view and viewing direction of the camera capturing the video imagery, possibly with depth information of the camera's imagery and/or a model of space in which the event occurs, may be used to map the location information (which may reference a global coordinate system) to locations within the video imagery for subsequent display of the comments. Likewise, one or more of the focus information, focus-direction information and comment part information may be interpreted to relate to locations or directions relative to the video imagery as appropriate. The comment receiving apparatus 106, 107 may be caused to provide for interpretation of the time information to relate it to an elapsed time during the video imagery of the event and similarly with the duration information.

The location information may be derived from one or more of commenting user input, positioning systems at the event including indoor positioning systems, from sensors of the electronic device 106 used to submit the comment, by the server 107 receiving the comment, from cross referencing of commenting user identity with other databases such as event seating allocation databases, from the commenting user scanning or entering a code printed on their ticket for the event, their seat or at their location, and if the comment is a photograph, video or audio comment, from visual and/or audio analysis of the photograph, video or audio comment. Thus, geotagging metadata placed in the photograph, video or audio by the commenting user's electronic device 106 may provide the location information. Further, features visible in the photograph or video may be compared to a model or images of the space in which the event is held to determine from where the photograph or video was captured and therefore provide the location information. For audio comments, the relative volume of background sounds may be compared to the sound captured by microphones at known locations around the event to determine a location at the event where the audio was captured using audio analysis techniques. If the location information is representative of the focus of the comment and not the location of the commenting user, the location information may also be determined from the commenting user identifying an object or occurrence. It will be appreciated that many different techniques may be used for determining the location information.

The focus information may be derived from one or more of commenting user input, from sensors of the electronic device 106 used to submit the comment, by the server 107 receiving the comment, by the user selecting an object or occurrence from a predetermined list provided to the commenting user 101, visual analysis of an image from a camera of the electronic device 106 to identify an object or occurrence therein, audio analysis of the audio based comment, text analysis of a text based comment and any other technique for identification of the focus.

The time information may be derived from one or more of the time of submission of the comment, the text of the comment indicating a time during the event or mentioning an occurrence that can be temporally placed using the event-occurrence information, the metadata of a photograph, audio or video based comment, visual analysis of a photograph or video based comment to compare it to visual data of the event to temporally place the photograph or video based comment, audio analysis of the video or audio based comment to compare it to audio data of the event for which the timing of the audio relative to the event is known.

The duration information may be determined from one or more of information provided by the commenting user, context analysis of the comment or based on the number of comments received per unit time and optionally per area of the video imagery i.e. comment density within a particular area of the video imagery in a particular time window.

Figure 6:
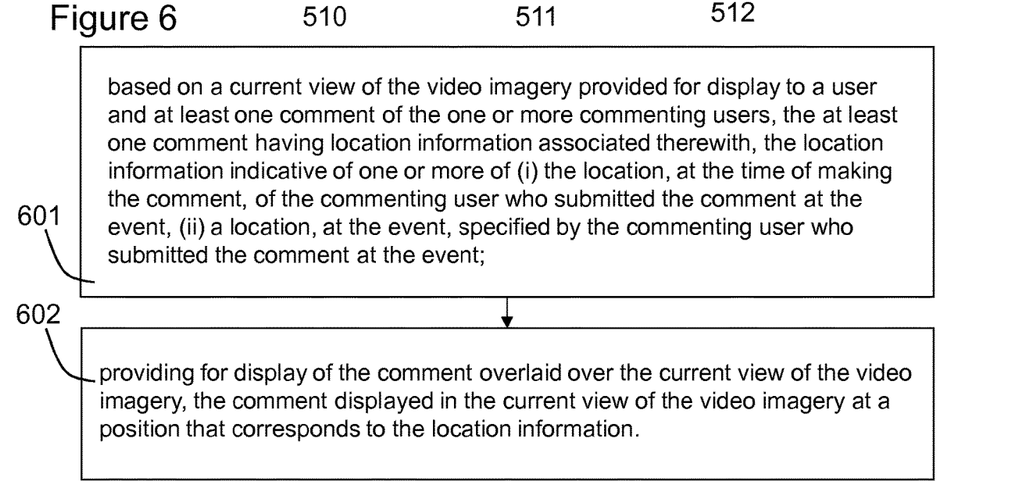
FIG. 6 illustrates a flowchart according to a method of the present disclosure.

FIG. 6 shows a flow diagram illustrating the steps of in respect of video imagery of an event at which one or more commenting users are present and have submitted comments, a location of the or each of the one or more commenting users visible in the video imagery;
  based on 601 a current view of the video imagery provided for display to a user and at least one comment of the one or more commenting users, the at least one comment having location information associated therewith, the location information indicative of one or more of (i) the location, at the time of making the comment, of the commenting user who submitted the comment at the event, (ii) a location, at the event, specified by the commenting user who submitted the comment at the event;
  providing 602 for display of the comment overlaid over the current view of the video imagery, the comment displayed in the current view of the video imagery at a position that corresponds to the location information.

Figure 7:
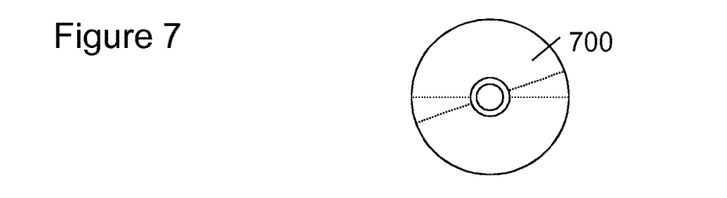
FIG. 7 illustrates schematically a computer readable medium providing a program.

FIG. 7 illustrates schematically a computer/processor readable medium 700 providing a program according to an example. In this example, the computer/processor readable medium is a disc such as a digital versatile disc (DVD) or a compact disc (CD). In other examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a wearable device or a module/circuitry for one or more of the same.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
    at least one processor; and
    at least one memory including computer program code,
    the at least one memory and the computer program code configured to, with the at least one processor, cause the apparatus to perform at least the following:
    based on a current view of video imagery of a scene provided for display to a user, and at least one comment of the one or more commenting users, the at least one comment having location information associated therewith, the location information indicative of one or more of (i) the location of the commenting user relative to the scene, at the time of making the comment, or (ii) a location relative to the scene specified by the commenting user who submitted the comment,
    provide for display of the comment overlaid over the current view of the video imagery, the comment displayed in the current view of the video imagery at a position that corresponds to the location information indicative of the at least one of the location of the commenting user relative to the scene at the time of making the comment, or the location relative to the scene specified by the commenting user.

2. An apparatus as claimed in claim 1, wherein the comment has time information associated therewith, the time information indicative of one or more of
    a time during the event at which the commenting user submitted the comment at the event; a time, occurring within the temporal duration of the event, specified by the commenting user who submitted the comment at the event;
    a time during the event determined from analysis of the context of the wording of the comment;
    a time during the event at which the commenting user created the comment; or
    where the comment comprises audio or video media, a time during the event determined from a time of recording of the audio or video media; and the apparatus is caused to provide for display of the comment for a time period less than a total duration of the video imagery and corresponding to the time information.

3. An apparatus as claimed in claim 2, wherein the time information includes duration information comprising the duration of time for which the comment should be displayed.

4. An apparatus as claimed in claim 1, the location information specified by the commenting user comprises an object appearing in the video imagery; and the apparatus is caused to provide for display of the comment at a position that corresponds to the location of the object as its position in the video imagery over time changes over time.

5. An apparatus as claimed in claim 1, wherein the comment has focus information associated therewith, the focus comprising an object or occurrence at the event to which the comment is directed; and the apparatus is caused to provide for display of the comment with one or more of; (i) a focus indicator showing at least the direction in the visual imagery corresponding to the focus information or (ii) a location in the visual imagery based on the focus information.

6. An apparatus as claimed in claim 5, wherein the focus-direction information is one or more of specified by the commenting user who submitted the comment at the event or determined from the orientation of an electronic device used by the commenting user to submit the comment at the time the comment was submitted.

7. An apparatus as claimed in claim 1, wherein the one or more comments comprise one or more of;
    text comment;
    photograph comment;
    picture comment;
    audio comment;
    video comment;
    expression of a reaction to the event, comprising at least one of "like", "love", "dislike", "hate" or expression of a vote related to the event.

8. An apparatus as claimed in claim 1, wherein the comment comprises one or more of an audio comment or a video comment, recorded by the commenting user, or wherein the apparatus is caused to provide for display of the comment by way of an activatable icon configured to, on user actuation, provide for playback of the audio or video comment.

9. An apparatus as claimed in claim 1, wherein the comment includes audio content and the apparatus is caused to provide for playback of the audio content with a spatial audio effect, such that the perceived direction of the source of the audio content relative to the video imagery corresponds to the location information.

10. An apparatus as claimed in claim 1, wherein the apparatus is caused to provide for display of, prior to display of the comment, an activatable comment icon indicative of a comment being available for presentation to the user, the apparatus configured to, on user actuation of the activatable comment icon, provide for the presentation of the comment.

11. An apparatus as claimed in claim 1, wherein the comment comprises at least a first comment part having a first direction associated therewith and a second comment part having a second direction associated therewith; and the apparatus is caused to provide for display of the first comment part when the video imagery is oriented in a direction substantially corresponding to the first direction and the second comment part when the video imagery is oriented in a direction substantially corresponding to the second direction.

12. An apparatus as claimed in claim 1, wherein the apparatus is caused to provide for display of a user-activatable link along with the one or more comment, the link comprising a reference to a temporal portion of the event, and upon activation of the link, provide for a replay of the temporal portion of the event.

13. A method comprising;
    based on a current view of video imagery of a scene provided for display to a user and at least one comment of one or more commenting users, the at least one comment having location information associated therewith, the location information indicative of one or more of (i) the location of the commenting user relative to the scene, at the time of making the comment, or (ii) a location relative to the scene, specified by the commenting user who submitted the comment,
    providing for display of the comment overlaid over the current view of the video imagery, the comment displayed in the current view of the video imagery at a position that corresponds to the location information indicative of the at least one of the location of the commenting user relative to the scene at the time of making the comment, or the location relative to the scene specified by the commenting user.

14. A method as claimed in claim 13, wherein the comment has time information associated therewith, the time information indicative of one or more of
    (a time during the event at which the commenting user submitted the comment at the event;
    a time, occurring within the temporal duration of the event, specified by the commenting user who submitted the comment at the event;
    a time during the event determined from analysis of the context of the wording of the comment;
    a time during the event at which the commenting user created the comment; or
    where the comment comprises audio or video media, a time during the event determined from a time of recording of the audio or video media; and the apparatus is caused to provide for display of the comment for a time period less than a total duration of the video imagery and corresponding to the time information.

15. A method as claimed in claim 14, wherein the time information includes duration information comprising the duration of time for which the comment should be displayed.

16. A method as claimed in claim 13, the location information specified by the commenting user comprises an object appearing in the video imagery; and the method further comprises providing for display of the comment at a position that corresponds to the location of the object as its position in the video imagery over time changes over time.

17. A method as claimed in claim 13, wherein the comment has focus information associated therewith, the focus comprising an object or occurrence at the event to which the comment is directed; and the method further comprises providing for display of the comment with one or more of; a focus indicator showing at least the direction in the visual imagery corresponding to the focus information or a location in the visual imagery based on the focus information.

18. A method as claimed in claim 17, wherein the focus-direction information is one or more of specified by the commenting user who submitted the comment at the event or determined from the orientation of an electronic device used by the commenting user to submit the comment at the time the comment was submitted.

19. A method as claimed in claim 13, wherein the one or more comments comprise one or more of;
    text comment;
    photograph comment;
    picture comment;
    audio comment;
    video comment;
    expression of a reaction to the event, comprising at least one of "like", "love", "dislike", "hate" or expression of a vote related to the event.

20. A non-transitory computer readable medium comprising program instructions stored thereon for performing at least the following:
    based on a current view of video imagery of a scene provided for display to a user and at least one comment of the one or more commenting users, the at least one comment having location information associated therewith, the location information indicative of one or more of (i) the location of the commenting user relative to the scene, at the time of making the comment, or (ii) a location relative to the scene specified by the commenting user who submitted the comment,
    provide for display of the comment overlaid over the current view of the video imagery, the comment displayed in the current view of the video imagery at a position that corresponds to the location information indicative of the at least one of the location of the commenting user relative to the scene at the time of making the comment, or the location relative to the scene specified by the commenting user.

* * * * *

UNITED STATES PATENT AND TRADEMARK OFFICE
CERTIFICATE OF CORRECTION

PATENT NO. : 10,972,800 B2  
APPLICATION NO. : 16/304811  
DATED : April 6, 2021  
INVENTOR(S) : Lehtiniemi et al.

Page 1 of 1

It is certified that error appears in the above-identified patent and that said Letters Patent is hereby corrected as shown below:

In the Claims

Column 21,
Line 37, "of the one or more commenting users" should read --of one or more commenting users--.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*